(12) United States Patent
Verma

(10) Patent No.: US 11,469,925 B2
(45) Date of Patent: Oct. 11, 2022

(54) CLOUD GATEWAY DEVICE AND METHOD FOR OPERATING A CLOUD GATEWAY DEVICE

(71) Applicant: Amit Verma, Taufkirchen (DE)

(72) Inventor: Amit Verma, Taufkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/254,291

(22) PCT Filed: Jun. 19, 2019

(86) PCT No.: PCT/EP2019/066272
§ 371 (c)(1),
(2) Date: Dec. 20, 2020

(87) PCT Pub. No.: WO2019/243454
PCT Pub. Date: Dec. 26, 2019

(65) Prior Publication Data
US 2021/0135904 A1    May 6, 2021

(30) Foreign Application Priority Data

Jun. 20, 2018 (EP) ..................................... 18178824

(51) Int. Cl.
*H04L 12/66* (2006.01)

(52) U.S. Cl.
CPC ..................................... *H04L 12/66* (2013.01)

(58) Field of Classification Search
CPC ................................ H04L 67/12; H04L 12/06
See application file for complete search history.

(56) References Cited

U.S. PATENT DOCUMENTS 10,257,163 B2 * 4/2019 Rotvold ................ H04L 63/061
2016/0147506 A1   5/2016 Britt
(Continued)

FOREIGN PATENT DOCUMENTS

CN      104184785 A      12/2014
CN      104333508 A       2/2015
(Continued)

OTHER PUBLICATIONS

Hellebrandt, Lukáš, et al. "Survey of privacy enabling strategies in iot networks." Proceedings of the 2017 International Conference on Computer Science and Artificial Intelligence. 2017. 216-221.
(Continued)

*Primary Examiner* — Shean Tokuta
(74) *Attorney, Agent, or Firm* — Lempia Summerfield Katz LLC

(57) ABSTRACT

A cloud gateway device and a method for operating the cloud gateway device is provided. The cloud gateway device is communicatively connected to one or more IIoT devices to at least collect data therefrom, and to the cloud to send collected data into the cloud. The cloud gateway device includes a transparency module provided for implementing transparency features into the cloud gateway device. Operating the cloud gateway device includes acquiring industrial data from the IIoT devices and/or the cloud gateway device, and computing information pertaining to the industrial data.

7 Claims, 3 Drawing Sheets

(56) References Cited

U.S. PATENT DOCUMENTS

| | | | | |
|---|---|---|---|---|
| 2016/0182309 A1* | 6/2016 | Maturana | ................ | G06F 30/20 |
| | | | | 709/224 |
| 2016/0379163 A1* | 12/2016 | Johanson | ........... | G06Q 10/0833 |
| | | | | 705/333 |
| 2016/0379165 A1* | 12/2016 | Moakley | ............ | G06Q 10/0833 |
| | | | | 705/333 |
| 2017/0019317 A1* | 1/2017 | Lawson | ................. | H04L 12/66 |
| 2017/0083987 A1* | 3/2017 | Colby | ................... | G06Q 50/06 |
| 2017/0366625 A1* | 12/2017 | Lau | .................... | G06Q 10/0833 |
| 2018/0115517 A1* | 4/2018 | Rotvold | ................ | H04L 63/068 |
| 2018/0288007 A1* | 10/2018 | Poornachandran | ......................... | |
| | | | | H04L 63/0421 |
| 2019/0044703 A1* | 2/2019 | Smith | .................... | G06F 21/45 |
| 2019/0046038 A1* | 2/2019 | Weinstein | ............ | A61B 5/0024 |
| 2019/0097835 A1* | 3/2019 | Bhat | ....................... | G06Q 10/06 |
| 2019/0132738 A1* | 5/2019 | Zhang | .................. | H04L 63/029 |
| 2019/0294822 A1* | 9/2019 | Hennebert | ............ | G06F 21/602 |
| 2021/0117555 A1* | 4/2021 | Bernat | .................. | H04L 9/3247 |
| 2021/0135904 A1* | 5/2021 | Verma | .................. | H04L 65/102 |

FOREIGN PATENT DOCUMENTS

| | | | |
|---|---|---|---|
| CN | 205356707 U | | 6/2016 |
| CN | 105725992 A | * | 7/2016 |
| CN | 205430283 U | | 8/2016 |
| CN | 106991776 A | | 7/2017 |
| CN | 206807475 U | | 12/2017 |
| CN | 107632557 A | | 1/2018 |
| CN | 107846668 A | | 3/2018 |
| CN | 108320814 A | * | 7/2018 |
| CN | 105725992 B | * | 9/2018 |
| CN | 210958810 U | * | 7/2020 |
| EP | 2631599 A2 | | 8/2013 |
| WO | 2014001037 A2 | | 1/2014 |

OTHER PUBLICATIONS

International Preliminary Report on Patentability for International Patent Application PCT/EP2019/066272 dated Oct. 5, 2020.

* cited by examiner

CLOUD GATEWAY DEVICE AND METHOD FOR OPERATING A CLOUD GATEWAY DEVICE

This application is the National Stage of International Application No. PCT/EP2019/066272, filed Jun. 19, 2019, which claims the benefit of European Patent Application No. EP 18178824.1, filed Jun. 20, 2018. The entire contents of these documents are hereby incorporated herein by reference.

FIELD

The present embodiments relate to cloud platforms for the Industrial Internet of Things (IIoT) and relate, in general, to a cloud gateway device functioning as an interface between a cloud platform and IIoT devices in an industrial plant. The present embodiments also relate to a method for operating such a cloud gateway device.

BACKGROUND

Industrial automation systems, machines, field devices, sensors, etc. (collectively termed as automation devices in the below) are connected to a cloud platform either directly or via cloud gateway devices. Automation devices connected to the cloud platform are termed as IIoT devices in the below.

Cloud gateway devices are known per se. A cloud gateway device is normally installed in a manufacturing unit. The cloud gateway device collects data from IIoT devices, optionally preprocesses analyses and/or encrypts the data, and forwards the data further to the cloud platform in the cloud. The cloud gateway device thus acts as an interface between the IIoT devices and the cloud platform. The cloud gateway device may also facilitate a closed loop control between the cloud and the IIoT devices.

Cloud gateway devices (e.g., cloud gateway or gateway in the below) are not unheard of as being perceived by its user/users as a "black box" (e.g., 3rd party's black box) in their network. Users (e.g., companies, plant operators, engineers, etc.) require transparency about operations performed by the cloud gateway device and transparency about the data transferred by the cloud gateway device. Users want transparency about the cloud gateway's operations and wish for audit capabilities on the cloud gateway, where the audit capabilities should show what data is being collected by the cloud gateway and sent to the cloud, which IIoT devices the cloud gateway is communicating with, and so on. Gateway management apps in the cloud basically provide this transparency already. However, users sometimes wish to scan all outgoing traffic, use their own data anonymizers, and enforce their IT and data handling policies on the outgoing data.

SUMMARY AND DESCRIPTION

The scope of the present invention is defined solely by the appended claims and is not affected to any degree by the statements within this summary.

There is a need for a cloud gateway device with increased functionality offering the required level of transparency.

The present embodiments may obviate one or more of the drawbacks or limitations in the related art. For example, transparency features are implemented in the cloud gateway device itself. Such "onboard" transparency features allow complete visibility and control of the relevant user's data leaving the user's plant, IT network or, more generally speaking, the user's organization via the cloud gateway device.

More specifically, the present embodiments provide a cloud gateway device that is adapted for being communicatively connected to one or more IIoT devices to at least collect data therefrom, and is also adapted for being communicatively connected to a cloud platform to send collected data into the cloud platform. The transparency features are implemented in the cloud gateway device itself by a transparency module. The transparency module is implemented in software and as thus stored in an internal memory of the cloud gateway device to be executed through processing means (e.g., microprocessor means) comprised by the cloud gateway device. The transparency module is adapted for computing information (e.g., transparency information) pertaining to industrial data acquired from the IIoT devices and/or the cloud gateway device, where the industrial data is, for example, inbound traffic data from an IIoT device to the cloud gateway device, outbound traffic data from the cloud gateway device to an IIoT device, and/or configuration data residing on the IIoT devices. The computation of the transparency information is the pivotal transparency feature provided by the transparency module and thus the transparency feature provided by the cloud gateway device. The transparency information may be displayed for being scrutinized by a user and/or may be transferred to another device for being checked there.

Another aspect of the present embodiments involves a method for operating a cloud gateway device providing transparency features implemented in the cloud gateway device itself.

With respect to the method, the present embodiments more specifically provide a method for operating a cloud gateway device as defined here and in the below, where the method includes the acts of acquiring industrial data as defined above from the IIoT devices and/or the cloud gateway device and computing information (e.g., transparency information) pertaining to the industrial data. Acquired industrial data and/or the transparency information resulting therefrom may be stored and/or optionally be displayed on an onboard display unit, local to the cloud gateway device, and/or optionally be made available for being sent to an external device or system, such as a user premises IT system, or for being retrieved by such external device or system.

Further aspects, features, and advantages of the present embodiments will become apparent from the drawings and detailed description of the following exemplary embodiments.

BRIEF DESCRIPTION OF THE DRAWINGS

The above-mentioned and other concepts of the present embodiments will now be addressed with reference to drawings of exemplary embodiments. The shown embodiments are intended to illustrate, but not to limit the invention. The drawings contain the following figures, in which like numbers refer to like parts throughout the description and drawings, where.

DETAILED DESCRIPTION

Figure 1:
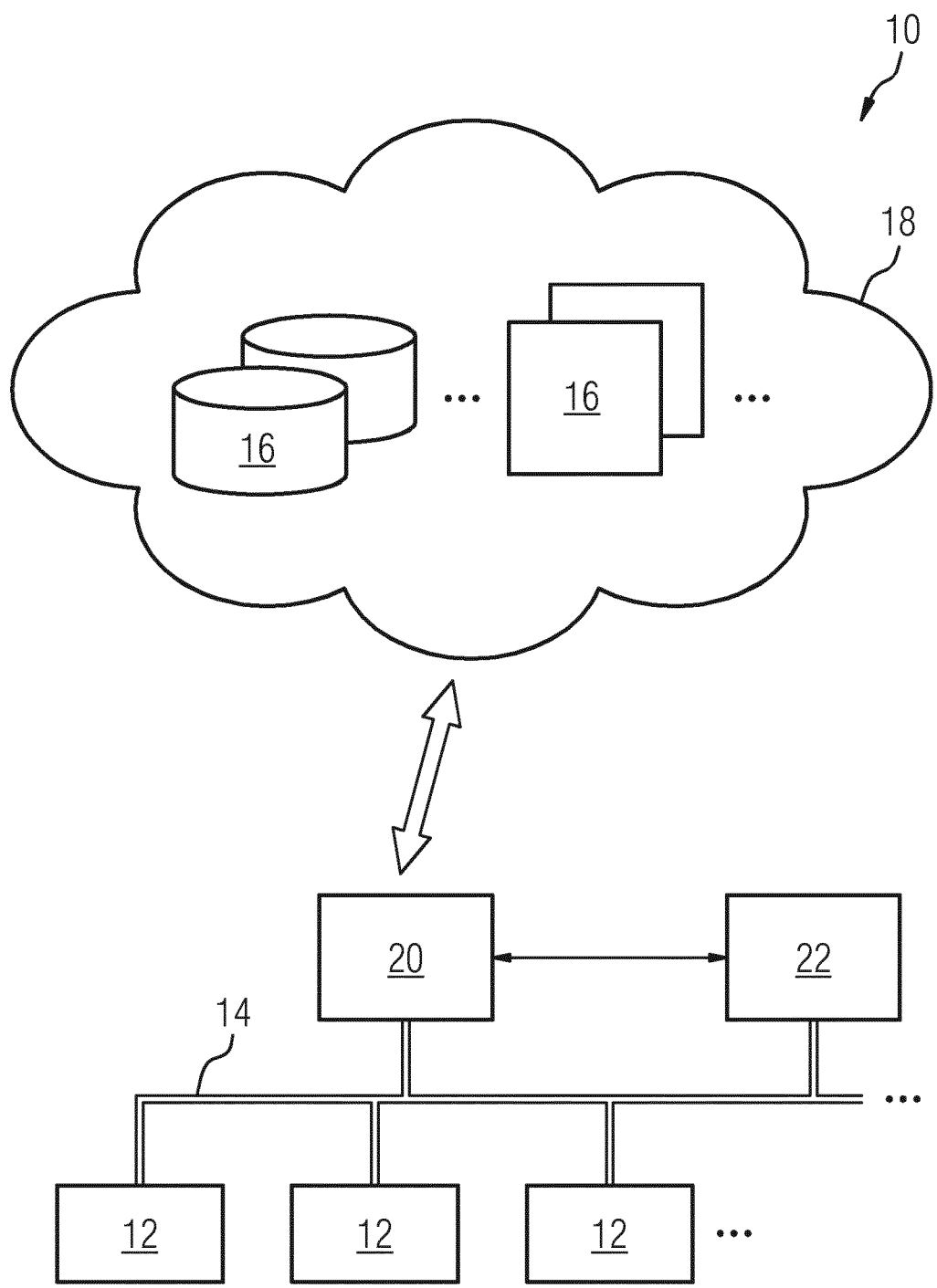
FIG. 1 shows a schematic diagram of one embodiment of an IIoT system.

FIG. 1 shows a schematic diagram of one embodiment of an IIoT system 10 including onsite IIoT devices 12 (often termed "assets" in professional terminology) interconnected via a network 14 and services 16 (e.g., cloud services) available in a cloud platform 18, as well as a cloud gateway device 20. The gateway device 20 is connected to the network 14 and functions as an interface between the IIoT devices 12 and the cloud services 16.

As is known in the art per se, some IIoT devices 12 may be part of a technical process (e.g., an industrial production process, such as an IIoT device 12, may be an actor or a sensor installed in the relevant process), and some IIoT devices 12 may be part of an automation system provided for controlling and/or supervising the process (e.g., an IIoT device 12 may be a PLC device, a SCADA device, or an HMI device). Generally speaking, the subject IIoT devices 12 are IIoT devices 12 in an industrial plant.

As is also known in the art per se, services 16 available in the cloud (e.g., cloud services) include, for example, data storage services, data processing services, data analytics services, etc.

FIG. 1 also shows, in simplified and schematic form, a user premises IT system 22 that is optionally communicatively connected to the network 14 and is provided for interfacing with the cloud gateway device 20 when accessing transparency features implemented in the cloud gateway device 20, as explained in more detail below.

FIG. 2 shows, again in simplified and schematic form, an exemplary embodiment of a cloud gateway device 20 (e.g., "gateway") as proposed herein with more details. The cloud gateway device 20 may be a pure software application or may alternatively be, as shown, a physical device, including software functionality, with an onboard display unit 24. A physical device functioning as a cloud gateway device 20 includes an internal memory 26 and a processing device 28 (e.g., a microprocessor).

A software stack of the cloud gateway device 20 includes an embedded operating system 30 and middleware 32, where the middleware is provided for functions such as containerization, virtualization, and/or software module management.

A data-acquisition module 40 implements the device drivers for collecting data from an IIoT device 12 (FIG. 1) or IIoT devices 12, and for managing an IIoT device 12 or IIoT devices 12 connected to the cloud gateway device 20. The data collected by the data-acquisition module 40 is termed industrial data hereinafter and is inbound traffic data from an IIoT device 12 to the cloud gateway device 20, outbound traffic data from the cloud gateway device 20 to an IIoT device 12, configuration data residing on the IIoT devices 12, or any combination thereof.

An optional onboard analytics module 42 is provided for pre-processing industrial data collected by the data-acquisition module 40 and for running onboard analytics algorithms and apps.

An optional device management module 44 is provided for deploying and managing a configuration (e.g., data acquisition settings, firmware upgrade, etc.) of the cloud gateway device 20.

An optional connectivity module 46 is provided for managing network interfaces to the cloud 18 (FIG. 1) and to the IIoT devices 12 (FIG. 1) connected to the cloud gateway device 20.

The aforementioned modules (e.g., the data-acquisition module 40, the analytics module 42, the management module 44, and the connectivity module 46), as well as relevant corresponding functionalities are known per se and are therefore not described here in more detail.

Figure 2:
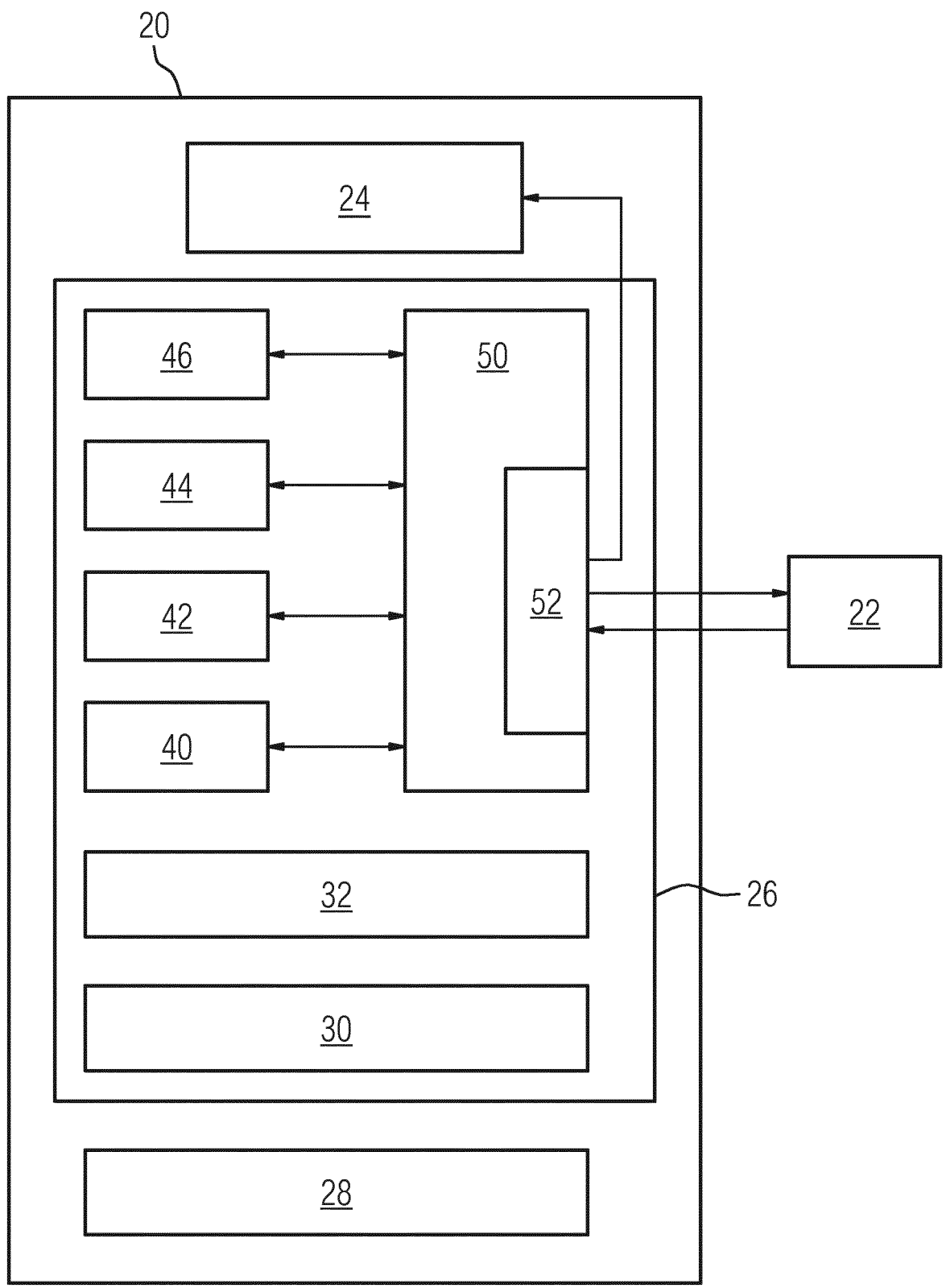
FIG. 2 shows one embodiment of a cloud gateway device.

In the exemplary embodiment shown in FIG. 2, the audit and transparency feature provided is, for example, implemented in the form of a transparency module 50, and the transparency module 50 is part of the software stack of the cloud gateway device 20. The transparency module 50 is thus stored in the internal memory 26 of the cloud gateway device 20 and is executed by the processing device 28 of the cloud gateway device 20 during operation of the cloud gateway device 20.

The transparency module 50 is adapted for computing information (e.g., transparency information) pertaining to the industrial data, acquired from the IIoT devices 12 and/or the cloud gateway device 20 with the help of defined interfaces (e.g., REST interface, MODBUS interface) and on an on demand basis. To this end, the transparency module 50 is adapted for computing transparency information based on at least one of the following by interfacing internally with at least one of the other modules 40-46 comprised by the cloud gateway device 20: 1. Data traffic (e.g., inbound data traffic, such as from IIoT devices 12 to the gateway 20) and/or outbound data traffic (e.g., from the gateway 20 to the cloud 18); 2. Configuration data pertaining to the data acquisition. The configuration data may include, for example, one or more of the following: time series variables collected along with corresponding sampling frequency; data buffers (e.g., diagnostic buffers from PLCs) from the IIoT devices 12 being collected; number of IIoT devices 12 connected to the gateway 20 along with corresponding IP addresses; write operations by the gateway 20 destined for at least one of the IIoT devices 12 connected to the gateway 20; anonymization status (e.g., data pertaining to whether anonymization is being performed on the data by the gateway 20); and details of onboard analytics being performed on the data.

The transparency information may be displayed on a display device (e.g., on an onboard display unit 24 of the cloud gateway device 20). Additionally and/or alternatively, the information is made available externally by being transferred via an interface 52 of the cloud gateway device 20 (e.g., an API or a REST API or a plurality of APIs or REST APIs) to, for example, an external system.

The arrow originating at the interface 52 and pointing outwards of the cloud gateway device 20 is meant to symbolize such information made available to, for example, an external system such as a user premises IT system 22 (FIG. 1, FIG. 2).

The arrow originating at the interface 52 and pointing towards the onboard display unit 24 is meant to symbolize information being displayed through the onboard display unit 24.

The following is a non-exhaustive list of features implemented by the transparency module 50 for supporting, for example, IT policies of a user of the cloud gateway device 20. 1. The transparency module 50 allows for starting and stopping the industrial data acquisition locally on the cloud gateway device 20. Relevant actions are initiated automatically by the transparency module 50 upon receipt of respective data acquisition start or data acquisition stop commands (e.g., PUT iotgateway/audit/stop-all-data-transfer, PUT iotgateway/audit/resume-all-data-transfer). 2. The transparency module 50 allows for obtaining a parallel stream of all the data collected by the cloud gateway device 20 and/or all the data transferred to the cloud platform 18 by the cloud gateway device 20. Relevant actions are initiated automatically by the transparency module 50 upon receipt of respective data acquisition commands (e.g., GET iotgateway/audit/inbound-data-stream, GET iotgateway/audit/outbound-datastream). 3. The transparency module 50 allows for inspecting all control signals used by the cloud gateway device 20 and/or allows for inspecting all write operations of the cloud gateway device 20 on the IIoT devices 12 (e.g., optionally before performed by the cloud gateway device 20). Again, relevant actions are initiated automatically by the transparency module 50 upon receipt of respective data acquisition commands (e.g., GET iotgateway/audit/all-control-operations, GET iotgateway/audit/all-write-operations). 4. The transparency module 50 allows for plugging in custom anonymization modules by the user, so that the data collected and/or processed by the cloud gateway device 20 may be anonymized as per the requirements of the user and IT policies. A relevant module is installed on the cloud gateway device 20 and integrated into the software stack of the cloud gateway 20 upon receipt of a respective deployment command (e.g., PUT iotgateway/audit/deploy-custom-anonymizer).

One or more of the above features may be made available as APIs on the cloud gateway device 20 within the transparency module's 50 interface 52. The transparency module 50 includes processing functionality provided for interpreting and executing one or more of the aforementioned commands, receivable from, for example, a user premises IT system 22. The data identified in an acquisition command or a plurality of acquisition commands and being made available through the transparency module 50 is displayed by the onboard display unit 24 and/or being transferred to the original requester (e.g., the premises IT system 22 or a dedicated device therein) to be displayed and/or processed there as appropriate.

Figure 3:
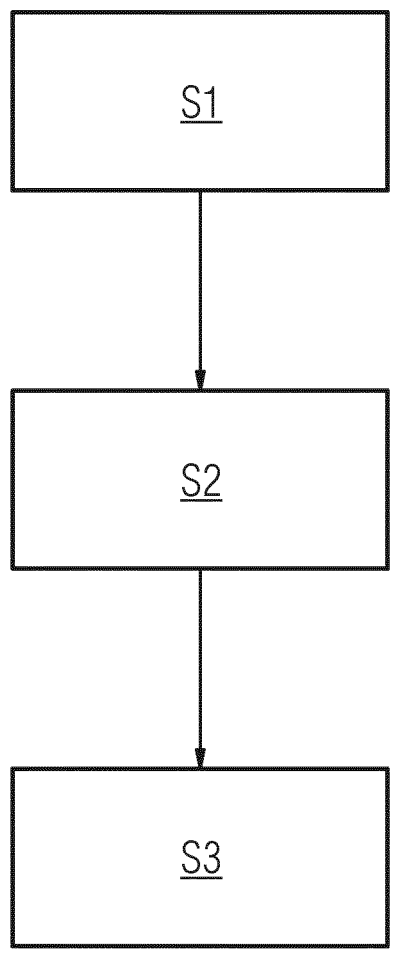
FIG. 3 shows a simplified flowchart of exemplary method acts performed by a cloud gateway device.

FIG. 3 is a simplified flowchart, showing the acts performed by the cloud gateway device 20 when operating according to the present embodiments. Act S1 includes acquiring the industrial data from the IIoT devices 12 and/or the cloud gateway device 20. Act S2 includes computing information pertaining to the industrial data. Act S3 includes displaying the computed information pertaining to the industrial data on the onboard display unit 24 of the cloud gateway device 20.

The present embodiments provide the following advantages to the supplier and system integrator: Data processed by the cloud gateway device 20 and/or sent by the cloud gateway device 20 to the cloud 18 becomes fully accessible for the user of the cloud gateway without having to make use of 3rd party apps available in the cloud 18. The user now has the ability to better check if sensitive data is processed correctly and/or may apply additional acts for processing (e.g., encrypting the data), as seen fit.

In addition to the embodiments described above, those of skill in the art will be able to arrive at a variety of other arrangements and acts that, if not explicitly described in this document, nevertheless embody the principles of the present embodiments and fall within the scope of the appended claims.

A cloud gateway device 20 and a method for operating the same are provided. The cloud gateway device 20 is conventionally communicatively connected to one or more IIoT devices 12 to at least collect data therefrom and to the cloud 18 for sending collected data into the cloud 18. The cloud gateway device 20 includes a transparency module 50 provided for implementing transparency features into the cloud gateway device 20, and operating the cloud gateway device 20 includes acquiring industrial data from the IIoT devices 12 and/or the cloud gateway device 20 and computing information (e.g., transparency information) pertaining to the industrial data.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A cloud gateway device adapted for being communicatively connected to one or more IIoT devices to at least acquire industrial data therefrom, and adapted for being communicatively connected to a cloud platform to send the collected industrial data to the cloud platform, the cloud gateway device comprising:
a processor;
a memory coupled to the processor;
a transparency module; and
an on-board display unit,
wherein the transparency module is stored in the memory in the form of machine-readable instructions and is executable by the processor,
wherein the transparency module is adapted for computing transparency information pertaining to the industrial data acquired from the one or more IIoT devices, the cloud gateway device, or the one or more IIoT devices and the cloud gateway device,
wherein the computation of the transparency information comprises interfacing internally with an onboard analytics module and a data-acquisition module, the onboard analytics module being configured for pre-processing the industrial data collected by the data-acquisition module based on inbound traffic data from an IIoT device of the one or more IIoT devices to the cloud gateway device, outbound traffic data from the cloud gateway device to an IIoT device of the one or more IIoT devices, configuration data residing on the one or more IIoT devices, or any combination thereof,
wherein the on-board display unit is configured to display the transparency information pertaining to the acquired industrial data and computed by the cloud gateway device,
wherein the transparency module is configured to allow for plugging in custom anonymization modules by a user, so that the data collected, processed, or collected and processed by the cloud gateway device is anonymized as per requirements of the user and IT policies,
wherein a relevant module is installed on the cloud gateway device and integrated into a software stack of the cloud gateway device upon receipt of a respective deployment command, and
wherein the transparency module is configured to inspect all control signals used by the cloud gateway device and inspect all write operations of the cloud gateway device on the one or more IIoT devices before the write operations are performed by the cloud gateway device upon receipt of a respective data acquisition command from an external device or system.

2. The cloud gateway device of claim 1, further comprising an interface configured to transfer the transparency information pertaining to the industrial data to an external device or system.

3. A method for operating a cloud gateway device adapted for being communicatively connected to one or more IIoT devices to at least acquire industrial data therefrom, and adapted for being communicatively connected to a cloud platform to send the collected industrial data to the cloud platform, the cloud gateway device comprising a processor, a memory coupled to the processor, a transparency module, and an on-board display unit, wherein the transparency module is stored in the memory in the form of machine-readable instructions and is executable by the processor, wherein the transparency module is adapted for computing transparency information pertaining to the industrial data acquired from the one or more IIoT devices, the cloud gateway device, or the one or more IIoT devices and the cloud gateway device, wherein the computation of the transparency information comprises interfacing internally with an onboard analytics module and a data-acquisition module, the onboard analytics module being configured for pre-processing the industrial data collected by the data-acquisition module based on inbound traffic data from an IIoT device of the one or more IIoT devices to the cloud gateway device, outbound traffic data from the cloud gateway device to an IIoT device of the one or more IIoT devices, configuration data residing on the one or more IIoT devices, or any combination thereof, wherein the on-board display unit is configured to display the transparency information pertaining to the acquired industrial data and computed by the cloud gateway device, wherein the transparency module is configured to allow for plugging in custom anonymization modules by a user, so that the data collected, processed, or collected and processed by the cloud gateway device is anonymized as per requirements of the user and IT policies, and wherein a relevant module is installed on the cloud gateway device and integrated into a software stack of the cloud gateway device upon receipt of a respective deployment command, the method comprising:
acquiring, by the cloud gateway device, the industrial data from the one or more IIoT devices, the cloud gateway device, or the one or more IIoT devices and the cloud gateway device;
computing, by the transparency module, the transparency information pertaining to the industrial data;
displaying the transparency information pertaining to the industrial data on the on-board display unit; and
inspecting, by the transparency module, all control signals used by the cloud gateway device and inspecting, by the transparency module, all write operations of the cloud gateway device on the one or more IIoT devices before the write operations are performed by the cloud gateway device upon receipt of a respective data acquisition command from an external device or system.

4. The method of claim 3, further comprising:
activating a data-acquisition module residing in the memory for being executed by the processor,
wherein the data-acquisition module is adapted for acquiring the industrial data from the one or more IIoT devices, the cloud gateway device, or the one or more IIoT devices and the cloud gateway device.

5. The method of claim 3, further comprising:
transferring the transparency information pertaining to the industrial data to an external device or system by an interface comprised by the cloud gateway device.

6. A cloud computing environment comprising:
a cloud platform configured to provide one or more cloud services;
a cloud gateway device adapted for being communicatively connected to one or more IIoT devices to at least acquire industrial data therefrom, and adapted for being communicatively connected to a cloud platform to send the collected industrial data to the cloud platform, the cloud gateway device comprising a processor, a memory coupled to the processor, a transparency module, and an on-board display unit, wherein the transparency module is stored in the memory in the form of machine-readable instructions and is executable by the processor, wherein the transparency module is adapted for computing transparency information pertaining to the industrial data acquired from the one or more IIoT devices, the cloud gateway device, or the one or more IIoT devices and the cloud gateway device, wherein the computation of the transparency information comprises interfacing internally with an onboard analytics module and a data-acquisition module, the onboard analytics module being configured for pre-processing the industrial data collected by the data-acquisition module based on inbound traffic data from an IIoT device of the one or more IIoT devices to the cloud gateway device, outbound traffic data from the cloud gateway device to an IIoT device of the one or more IIoT devices, configuration data residing on the one or more IIoT devices, or any combination thereof, wherein the on-board display unit is configured to display the transparency information pertaining to the acquired industrial data and computed by the cloud gateway device, wherein the transparency module is configured to allow for plugging in custom anonymization modules by a user, so that the data collected, processed, or collected and processed by the cloud gateway device is anonymized as per requirements of the user and IT policies, wherein a relevant module is installed on the cloud gateway device and integrated into a software stack of the cloud gateway device upon receipt of a respective deployment command, and wherein the transparency module is configured to inspect all control signals used by the cloud gateway device and inspect all write operations of the cloud gateway device on the one or more IIoT devices before the write operations are performed by the cloud gateway device upon receipt of a respective data acquisition command from an external device or system; and
the one or more IIoT devices in an industrial plant,
wherein the cloud gateway device is communicatively connected to the cloud platform, and
wherein the one or more IIoT devices are communicatively connected to the cloud gateway device.

7. In a non-transitory computer-readable storage medium that stores instructions executable by one or more processors to operate a cloud gateway device adapted for being communicatively connected to one or more IIoT devices to at least acquire industrial data therefrom, and adapted for being communicatively connected to a cloud platform to send the collected industrial data to the cloud platform, the cloud gateway device comprising a processor, a memory coupled to the processor, a transparency module, and an on-board display unit, wherein the transparency module is stored in the memory in the form of machine-readable instructions and is executable by the processor, wherein the transparency module is adapted for computing transparency information pertaining to the industrial data acquired from the one or more IIoT devices, the cloud gateway device, or the one or more IIoT devices and the cloud gateway device, wherein the computation of the transparency information comprises interfacing internally with an onboard analytics module and a data-acquisition module, the onboard analytics module being configured for pre-processing the industrial data collected by the data-acquisition module based on inbound traffic data from an IIoT device of the one or more IIoT devices to the cloud gateway device, outbound traffic data from the cloud gateway device to an IIoT device of the one or more IIoT devices, configuration data residing on the one or more IIoT devices, or any combination thereof, wherein the on-board display unit is configured to display the transparency information pertaining to the acquired industrial data and computed by the cloud gateway device, wherein the transparency module is configured to allow for plugging in custom anonymization modules by a user, so that the data collected, processed, or collected and processed by the cloud gateway device is anonymized as per requirements of the user and IT policies, and wherein a relevant module is installed on the cloud gateway device and integrated into a software stack of the cloud gateway device upon receipt of a respective deployment command the instructions comprising:

acquiring the industrial data from the one or more IIoT devices, the cloud gateway device, or the one or more IIoT devices and the cloud gateway device;
  computing the transparency information pertaining to the industrial data;
  displaying the transparency information pertaining to the industrial data on the on-board display unit; and
  inspecting, by the transparency module, all control signals used by the cloud gateway device and inspecting, by the transparency module, all write operations of the cloud gateway device on the one or more IIoT device before the write operations are performed by the cloud gateway device upon receipt of a respective data acquisition command from an external device or system.

* * * * *